United States Patent [19]

Yeh et al.

[11] Patent Number: 5,024,869
[45] Date of Patent: Jun. 18, 1991

[54] FLAME RETARDANT FIBERS FOR TEXTILE USE

[75] Inventors: Ling Yeh; Hugh G. Harrelson, Jr., both of Anderson, S.C.

[73] Assignee: BASF Corporation, Williamsburg, Va.

[21] Appl. No.: 363,024

[22] Filed: Jun. 8, 1989

Related U.S. Application Data

[62] Division of Ser. No. 130,763, Dec. 9, 1987, Pat. No. 4,853,272.

[51] Int. Cl.$^5$ ............................................. B32B 3/02
[52] U.S. Cl. .................................... 428/97; 428/85; 524/105
[58] Field of Search ................... 428/85, 97; 524/105

[56] References Cited

U.S. PATENT DOCUMENTS

| | | | |
|---|---|---|---|
| 2,214,469 | 9/1940 | Linstead et al. | 540/137 |
| 2,276,860 | 3/1942 | Niemann et al. | 540/137 |
| 4,005,066 | 1/1977 | Gottschalk et al. | 534/693 |
| 4,598,020 | 7/1986 | Paonush | 428/411.1 |

*Primary Examiner*—James J. Bell

[57] ABSTRACT

The present invention pertains to thermoplastically processable synthetic polymers and fibers produced therefrom which are rendered flame retardant by certain organic pigments which are substantially unreactive with the polymer. The flame retardant materials include:
(i) carbon black pigment;
(ii)

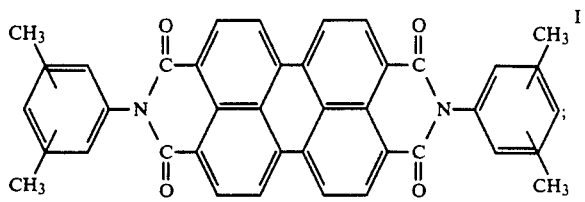

(iii) a chromium 1:2 complex azo dye wherein said dye has the following formula:

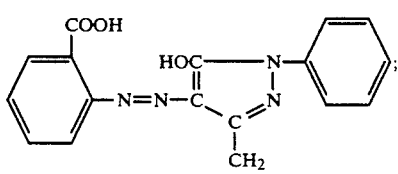

(iv)

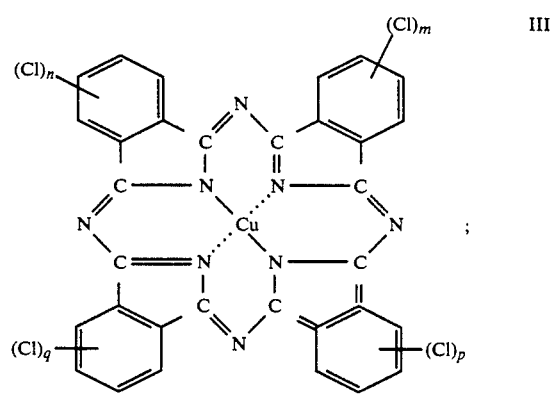

wherein: m, n, p, and q are each either 0 or an integer from 1 to about 4; or,
(v) mixtures thereof.

20 Claims, No Drawings

FLAME RETARDANT FIBERS FOR TEXTILE USE

This is a divisional of co-pending application Ser. No. 130,763, filed on Dec. 9, 1987, now U.S. Pat. No. 4,853,272.

BACKGROUND OF THE INVENTION

A. Field of the Invention

This invention relates to flame retardant synthetic polymers which find particular application in the production of filaments and fibers for use in the textile industry.

B. Description of the Prior Art

Numerous procedures have been proposed for conferring flame retardance on melt extruded filaments or fibers for use in the textile industry, such as the construction of carpets. One procedure has been to incorporate flame retardant materials into the polymer used to make the filaments or fibers by extruding the flame retardant material with the polymer.

Although this procedure has proven useful in certain instances, certain problems have remained. For instance, a number of flame retardant materials, when extruded with the polymer, result in finished polymers having an undesirably colored surface. Furthermore, resulting filaments containing the flame retardant materials, in many cases, have undesirable surface properties such as sensitivity to heat and light. Still further, many times the extruded material containing the synthetic polymer and flame retardant material is sensitive at the surface when the filaments are processed such as by passing them over guides, drawing them, or thermally treating them.

Another problem associated with a number of commercially available flame retardant materials is that it is necessary to incorporate large amounts, i.e., 20 to 40% by weight of the flame retardant, into the synthetic polymer. As a result, the physical properties of the synthetic polymer are modified which can result in the production of inferior fibers. Also, the incorporation of large amounts of flame retardant is uneconomical.

The term fiber as used herein includes fibers of extreme or indefinite length (i.e., filaments) and fibers of short length (i.e., staple). The term yarn, as used herein, means a continuous strand of fibers.

Carpet made from fibers of synthetic polymers, such as nylon fibers, is a popular floor covering for both residential and commercial applications. The typical carpet for residential applications has a primary backing material such as polypropylene, stretched with closely spaced erect loops or cut loops of yarn which extend upwardly from the backing to form a tufted structure (i.e., pile).

It is important that carpet have a combination of qualities, including safety, and aesthetically pleasing. Therefore, it is important that the fibers used for the carpet be fire retardant and not contain a significant amount of undesirable surface properties.

Thus, there is a need for materials which impart flame retardance to synthetic polymers used for fiber or yarn production without a concomitant reduction of physical properties of the fiber or yarn and which are effective in minor amounts such that commercially acceptable products are produced.

SUMMARY OF THE INVENTION

It has been surprisingly discovered that flame retardant polymer compositions can be prepared by incorporating into a thermoplastically, processable synthetic polymer minor amounts of certain organic pigments which are substantially nonreactive with the synthetic polymer. The resulting polymer compositions have excellent flame retardant properties while retaining excellent physical properties of the resulting synthetic polymers.

Fibers and yarns produced from the synthetic polymer find particular application in the textile industry such as in the construction of carpets.

DESCRIPTION OF THE PREFERRED EMBODIMENTS

The organic pigments useful in the present invention include:

(i) carbon black pigment;

(ii)

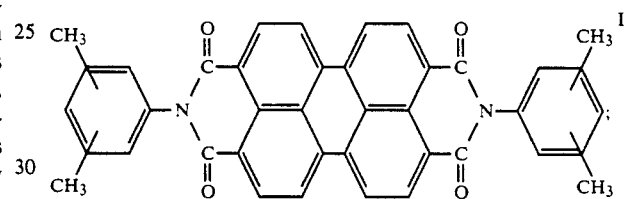

(iii) a chromium 1:2 complex azo dye wherein said dye has the following formula:

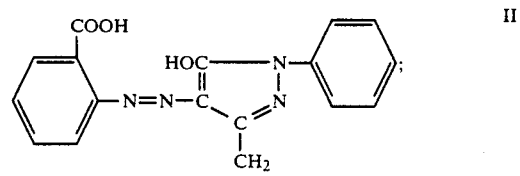

(iv)

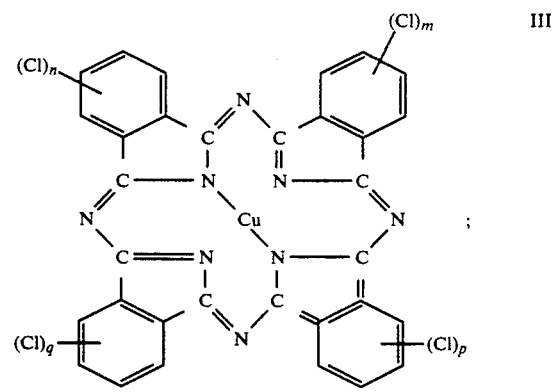

wherein: m, n, p, and q are each either 0 or an integer from 1 to about 4; and, mixtures thereof.

Preferably, in the compounds represented by formula III, the sum of m, n, p, and q is either 0 or an integer of 1, 15, or 16. These compounds have the following formulae:

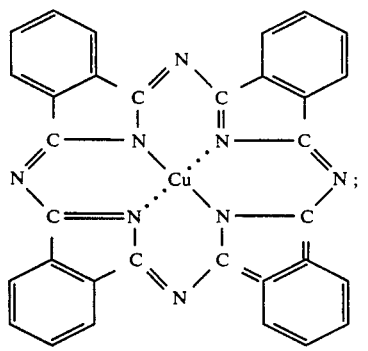

IV

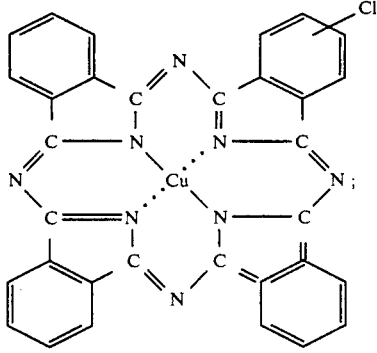

V and

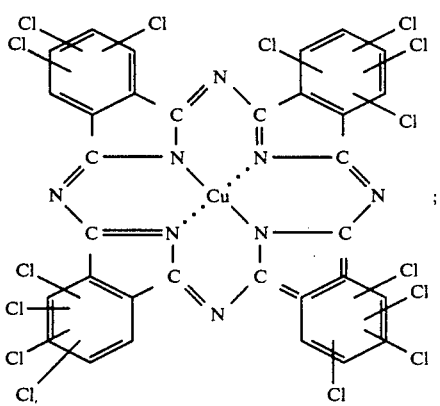

VI

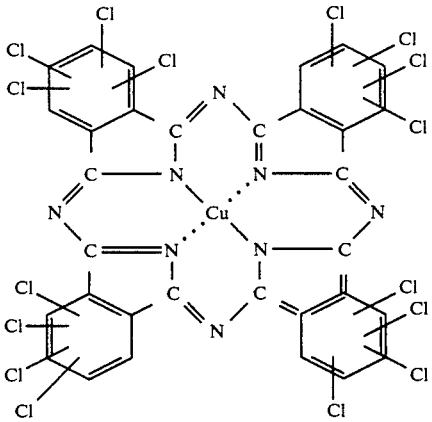

VII

Preferably, the carbon black pigments of the present invention have a particle size (arithmetic mean diameter) in the range of from about 10 nanometers to about 100 nanometers and, preferably, a particle size in the range of from about 15 to 60 nanometers. A preferred carbon black pigment is a furnace type of carbon black which is available from Cabot Company under the name Raven 1200.

Preferably, the methyl groups occupy the para position and one ortho position of the aniline moieties of formula I as set forth in the following structure

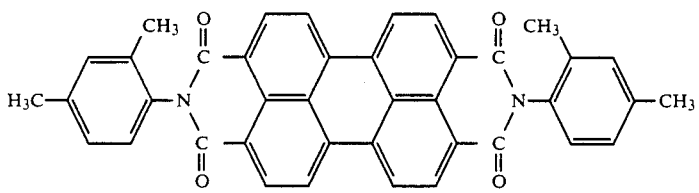

VIII

The preparation of the compound represented by formula I is known to persons skilled in the art. For instance, the compound can be prepared by condensing 2,4-dimethylaniline with 3,4,9,10-perylenetetracarboxylic acid. The compound is sometimes referred to as C.I. Pigment Red 149, and is available commercially from BASF Corporation as Paliogen Red K-3580.

The preparation of the chromium complex azo dyes is well known to persons skilled in the art. U.S. Pat. Nos. 4,598,020 and 4,005,066, which are assigned to the assignee of the present invention and are hereby incorporated by reference, disclose its preparation. The complex is commercially available from BASF Wyandotte Corporation as Zapon Yellow 157.

The preparation of compounds represented by formula III is well known to persons skilled in the art. For example, see U.S. Pat. Nos. 2,276,860 and 2,214,469, which are hereby incorporated by reference.

The compound represented by formula IV is sometimes referred to as C.I. Pigment Green 7, and is commercially available from BASF Corporation as Heliogen Green K-8683. The compound represented by formulae IV and/or V is sometimes referred to as C.I. Pigment 15, and is commercially available from BASF Corporation as Heliogen Blue as D-7080.

The effective amount of flame retardant required to be added to the synthetic polymer is somewhat dependent on the flame retardant and polymer utilized. A sufficient amount of retardant should be utilized to impart flame retardance to the polymer, but an excess that will adversely effect the polymer properties should be avoided. The optimum amount for each combination of polymer and retardant can be readily determined by one skilled in the art. In general, from about 0.5 to about 5.0% based on the weight of the polymer, preferably about 1.0 to about 3.0 percent, is utilized.

Examples of synthetic polymers suitable for use in the invention include synthetic thermoplastic polymers which are capable of being melt extruded as fibers including polyolefins, for example, homopolymers of olefins such as low-density polyethylene, high-density polyethylene, polypropylene, and the like, and copolymers of olefins with other ethylenically unsaturated monomers such as ethylene-propylene copolymer, ethylenebutene copolymer, ethylene-vinyl acetate copolymer, styrene-butadiene copolymer, acrylonitrile-styrene-butadiene copolymer and the like.

Polyamides find particular application in the present invention. Examples of such polyamides include homopolyamides and copolyamides which are obtained by the polymerization of lactam or aminocaprionic acid or a copolymerization product of diamine and dicarboxylic acid.

Typical polyamides include nylon 6, nylon 6,6, nylon 6,10, nylon 6,12, nylon 11, nylon 12, and copolymers thereof or mixtures thereof. Polyamides can be also copolymers of nylon 6 or nylon 6,6 and a nylon salt obtained by reacting a dicarboxylic acid component such as terephthalic acid, isophthalic acid, adipic acid and sebacic acid with a diamine such as hexamethylenediamine, methaxylenediamine, and 1,4-bisaminomethylcyclohexane.

Polyester also finds particular application in the present invention. The preferred polyesters are the linear terephthalate polyesters, i.e., polyesters of a glycol containing from 2 to 20 carbon atoms and a dicarboxylic acid component comprising at least about 75% terephthalic acid. The remainder, if any, of the dicarboxylic acid component may be any suitable dicarboxylic acid such as sebacic acid, adipic acid, isophthalic acid, sulfonyl-4,4-dibenzoic acid, or 2,8-di-benzofurandicarboxylic acid. The glycols may contain more than two carbon atoms in the chain, e.g., diethylene glycol, butylene glycol, decamethylene glycol, and bis-1,4-(hydroxymethyl) cyclohexane. Examples of linear terephthalate polyesters which may be employed include poly(ethylene terephthalate), poly(butylene terephthalate), poly(ethylene terephthalate/5-chloroisophthalate)(85/15), poly(ethylene terephthalate/5-[sodium sulfo]isophthalate)(97/3), poly(cyclohexane-1,4-dimethylene terephthalate), and poly(cyclohexane-1,4-dimethylene terephthalate/hexahydroterephthalate)(75/25).

Other additives commonly used in the preparation of fibers may also be present in the proportion that they are commonly used. Examples of such additives include delustrants, stabilizers, antimicrobials, and antistatic agents.

A particular advantage of the flame retardants of the present invention is that they function as a pigment in addition to their flame retardancy ability. Thus, the retardant provides a dual purpose. In addition, the retardants can be used with pigments which do not have a flame retardancy capability, and the resulting polymeric material still exhibits excellent flame retardancy.

The synthetic polymer and flame retardant are preferably melt-processed into fibers by procedures known to persons skilled in the art. For example, a mixture of synthetic polymer and flame retardant are typically extruded at a temperature above the melting point of the mixture, in the case of nylon 6 above 255 degrees Centigrade, through a spinneret to form a number of molten streams. The molten streams are processed by standard procedures known to one skilled in the art to converge the formed fibers into yarn. In many instances, the molten streams are preferably quenched in an inert atmosphere, i.e., an atmosphere substantially free of oxygen such as a nitrogen, steam, or carbon dioxide atmosphere.

It has been surprisingly found that the fire retardancy of the materials of the present invention can be further enhanced by applying, generally by coating the fiber surface, a spin finish that acts as a lubricant or antistatic agent and which comprises an organic chemical having low or no volatility. Examples of such chemicals include MAGIC, a product of Lutex Chemical Corporation, and Stantex N-7601, a product of Standard Chemical Products. It is believed that the chemical sold as MAGIC comprises a polyelectrolytic complex comprising a quarternized coconut oil fatty acid amine and a polyolefin, such as polyethylene or polypropylene having an anionic functional group such as a carboxyl group. When utilized, these chemicals are preferably applied to the fiber in a 5.0% by weight aqueous solution, and, to the fiber, an amount of about 0.15 weight percent based on the weight of the fiber or filament.

The following examples will serve to more comprehensively illustrate certain specific embodiments of the invention, but are not intended to be construed so as to be restrictive of the spirit and scope thereof.

EXAMPLES

The flame retardancy of fibers of the present invention was tested using the procedure described in Fed. Test Method Std. No. 372, dated August 31, 1977, and entitled "TEST FOR CRITICAL RADIANT FLUX OF CARPET FLOORING SYSTEMS (FLOORING RADIANT PANEL TEST)" which is hereby incorporated by reference. The method of the test involves a procedure for measuring the critical radiant flux at flameout of horizontally mounted carpet floor covering systems exposed to a flaming ignition source in a graded radiant heat energy environment, in a text chamber. The imposed radiant flux simulates the thermal radiation levels likely to impinge on the floors of a building whose upper surfaces are heated by flames and/or hot gases from a fully-developed fire in an adjacent room or compartment. The test, which was developed to simulate an important fire exposure component of fires which may develop in corridors or exitways of buildings, is different from many other fire test methods, in that it measures an actual property of the carpet system and is not based on an arbitrary scale.

Critical Radiant Flux is the level of incident radiant heat energy on the carpet floor covering system at the most distant flameout point. It is reported as watts/$cm^2$ (Btu/$ft^2$ sec). It is determined by measuring the distance that the carpet is burned, i.e., the point of farthest advance of the flame front, to the nearest 0.1 cm.

Government recommended minimum critical flux limits are: 0.45 watts/$cm^2$ within corridors and exitways of hospitals and nursing homes, and 0.22 watts/$cm^2$ within corridors and exitways of other occupancies except one- and two-family dwellings. These limits are described in the publication "NATIONAL BUREAU OF STANDARDS, U.S. DEPARTMENT OF COM- MERCE, PUB. NO. NBSIR-78-1436, FLAMMABILITY TESTING FOR CARPET (April 1978), which is hereby incorporated by reference.

The basic elements of the test chamber used in the tests are (1) an air-gas fueled, radiant heat energy panel inclined at 30 degrees to and directed at (2) a horizontally mounted floor covering system specimen. The radiant panel generates a radiant energy flux distribution ranging along the 100 cm length of the test specimen from a nominal maximum of 1.0 watts/cm$^2$ to a minimum of 0.1 watts/cm$^2$. The test is initiated by open flame ignition from a pilot burner. The distance burned to flameout is converted to watts/cm$^2$ from a flux profile graph, set forth in test procedure and reported as critical radiant flux, watts/cm$^2$.

EXAMPLE I

An amount of 56.25 grams of C.I. Pigment Red 149 concentrate (20% by weight) was mixed together with 1068.75 grams of Nylon 6 chips to yield a 1.0% by weight pigment concentration. The mixture was melt extruded under pressure of 1400 psi through a 28 orifice spinnerette to produce a fiber having about 1500 denier. In addition, the spin finish described in Example VII was also utilized. Four ends of 1500/28 feed yarn were drawn at 3.5 times the extruded length and textured with a hot air jet to produce yarn suitable for use in carpet. This yarn is hereinafter referred to as "yarn A". A control yarn containing no C.I. Pigment Red 149 or other flame retardant material was prepared in the same manner as described below. This yarn is hereinafter referred to as "yarn B".

The yarns were then two-plied by twisting two ends together with a 1.55 twist. The yarns were tufted into a level loop 28 oz/yd$^2$ carpet at about a 0.9 stitch/inch rate. A black Polybac polypropylene fabric was used as primary backing. Tufting was carried out on a conventional tufting machine operated to give level loop pile having a height of ⅛ inches.

The carpets were latex and secondary jute backed by conventional means at a rate of 30 oz/yd$^2$ of carpet on a dry basis. The latex was then cured at 125 degrees Centigrade.

The carpets were then tested to determine the distance burned and the critical energy necessary to propagate the flame as measured by Federal Test Method Standard No. 372, dated Aug. 31, 1977. The results of these tests are shown in Table I.

TABLE I

| Carpet System | Distance Burned (cm) | Critical Radiant Flux Watts/cm$^2$ |
|---|---|---|
| Made with yarn A | 35 | 0.62 |
| Made with yarn B | 82 | 0.13 |

It can be seen from the above results that distance burned of a carpet having yarns made from nylon and C.I. Pigment Red 149 as a flame retardant had excellent flame retardant properties. The flame retardant properties were better than both government recommended requirements.

EXAMPLE II

A flame retardant carpet was prepared by the same procedure as described in Example I except that during draw texturing two ends of 1500/28 feed yarn containing C.I. Pigment Red 149 and two ends of 1500/28 feed yarn without any flame retardant materials were used. The resulting carpet was tested in accordance with the previously described test. The results ar reported in Table II below.

TABLE II

| Distance Burned (cm) | Critical Radiant Flux Watts/cm$^2$ |
|---|---|
| 52 | 0.32 |

The results of these tests demonstrate the excellent flame retardant properties of yarn containing fibers containing the flame retardant material and fibers no containing flame retardant material.

EXAMPLE III

A flame retardant carpet was prepared by the same procedure as described in Example I except that 1.0% by weight C.I. Pigment Blue 15 was mixed with nylon chips. The resulting carpet was tested in accordance with the previously described test. The results are reported below in Table III.

TABLE III

| Distance Burned (cm) | Critical Radiant Flux Watts/cm$^2$ |
|---|---|
| 39 | 0.54 |

EXAMPLE IV

A flame retardant carpet was prepared by the same procedure as described in Example I except that 1.0% by weight C.I. Pigment Green 7 was mixed with nylon chips. The resulting carpet was tested in accordance with the previously described Critical Radiant Flux Test. The results are reported below in TABLE IV

TABLE IV

| Distance Burned (cm) | Critical Radiant Flux Watts/cm$^2$ |
|---|---|
| 44 | 0.46 |

EXAMPLE V

A flame retardant carpet was prepared by the same procedure as described in Example I except that 1.0% by weight of carbon black pigment, Raven 1200, was mixed with the nylon chips. The resulting carpet was tested in accordance with the previously described Critical Radiant Flux Test. The results are reported below in Table V.

TABLE V

| Distance Burned (cm) | Critical Radiant Flux Watts/cm$^2$ |
|---|---|
| 40 | 0.52 |

The results in Tables III through V demonstrate the effectiveness of the fire retardants of the present invention.

EXAMPLE VI

A flame retardant carpet was prepared by the same procedure as described in Example I except that 0.55% by weight of Filament Yellow 4G, 0.36 C.I. Pigment Red 149 and 0.09% Raven 1200 was mixed with the nylon chips. Filament Yellow 4G0 is an organic pigment that does not exhibit any appreciable fire retardant properties. The resulting carpet was tested in accor- -dance with the previously described Critical Radiant Flux Test. The results are reported below in Table VI

TABLE VI

| Distance Burned (cm) | Critical Radiant Flux Watts/cm$^2$ |
| --- | --- |
| 43 | 0.47 |

The results reported in Table VI demonstrate the effectiveness of fire retardant materials of the present invention even when yarns containing organic pigments that do not have any appreciable fire retardant properties are included with them.

EXAMPLE VII

The fire retardants of the present invention and spin finishes comprising organic chemicals having low or no volatility were tested on tufted carpets containing nylon fibers containing the fire retardants of the invention.

In some of the tests, the nylon fibers of the carpets were scoured to remove the spin finish from their surface. The finish used comprised 0.6 percent by weight Stantex N-7601 and 0.14 percent by weight MAGIC. The resulting carpets were tested in accordance with the previously described Critical Radiant Flux Test. The results are reported in Table VII.

TABLE VII

| | Critical Radiant Flux (Watts/cm$^2$) | |
| --- | --- | --- |
| Retardant Pigment Used | Scoured | Nonscoured |
| C.I. Pigment Black 7 | 0.50 | 0.52 |
| C.I. Pigment Green 7 | 0.30 | 0.52 |
| C.I. Pigment Red 149 | 0.16 | 0.56 |
| C.I. Pigment Blue 15 | 0.49 | 0.58 |
| Average | 0.36 | 0.55 |

The results of these tests demonstrate the effectiveness of the finishes in increasing the fire retardancy of fibers containing the fire retardants of the present invention.

Although the invention has been described in conjunction with preferred and alternate embodiments thereof, it is evident that many alternatives, modifications, and variations of the invention will be apparent to those skilled in the art in light of the foregoing description. Accordingly, it is intended to embrace within the invention all such alternatives, modifications, and variations that fall within the spirit and scope of the appended claims.

What is claimed is:

1. A method of preparing one or more flame retardant fibers comprising:
   (a) incorporating into a thermoplastically processable synthetic polymer a flame retardant amount of a flame retardant material consisting essentially of
     (i) carbon black pigment;
     (ii)

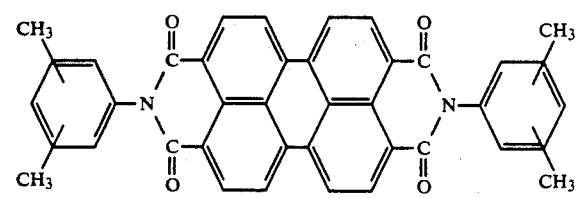

(iii)

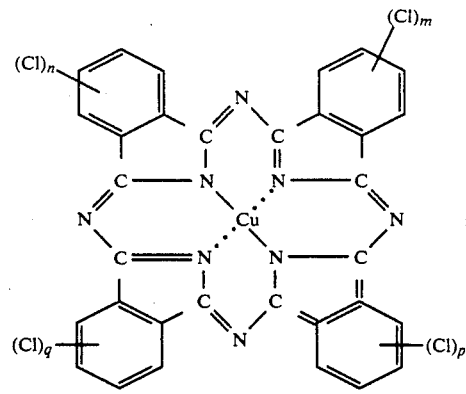

wherein: m, n, p, and q are each either 0 or an integer from 1 to about 4; or,
     (iv) mixtures thereof; and,
   (b) melt processing said synthetic polymer and said fire retardant material of step (a) into said one or more fibers.

2. The method recited in claim 1 wherein said thermoplastic processable synthetic polymer is selected from the group consisting of polyolefins, polyamides, polyesters, and mixtures thereof.

3. The method recited in claim 2 wherein said flame retardant material is present in said flame retardant composition in an amount in the range of 0.5 to about 5 weight percent based on weight of said polymer.

4. The method recited in claim 3 wherein the sum of m, n, p, and q is either 0 or an integer of 1, 15, or 16.

5. The method recited in claim 4 wherein said carbon black pigment is a furnace type and has a particle size in the range of from about 10 to about 100 nanometers.

6. The method recited in claim 5 wherein said synthetic polymer is selected from the group consisting of polyethylene terephthalate, polyethylene, polypropylene, nylon 6, nylon 6,6, and mixtures thereof.

7. The method recited in claim 6 wherein said resulting fibers have a critical radiant flux of at least 0.22 watts/cm$^2$.

8. The method recited in claim 7 wherein flame retardant material is present in said synthetic polymer is an amount in the range of from about 1.0 to 3.0 weight percent based on the weight of said polymer.

9. The method recited in claim 8 wherein said synthetic polymer is nylon 6.

10. The method recited in claim 9 wherein said one or more fibers have a critical radiant of at least 0.45 watts/cm$^2$.

11. The method recited in claim 3 further comprising coating said one or more fibers of step (b) with a polyelectrolytic complex comprising a quaternized coconut oil fatty acid amine and polyethylene or polypropylene having an anionic functional group.

12. A fire retardant yarn comprising the fibers prepared in accordance with claim 3.

13. A carpet having a pile comprising the fibers prepared in accordance with claim 12.

14. A method of preparing one or more flame retardant nylon 6 fibers having a critical radiant flux of at least 0.22 watts/cm, comprising:
   (a) incorporating into a thermoplastically processable synthetic polymer a flame retardant amount of a flame retardant material consisting essentially of
     (i) carbon black pigment;

(ii)

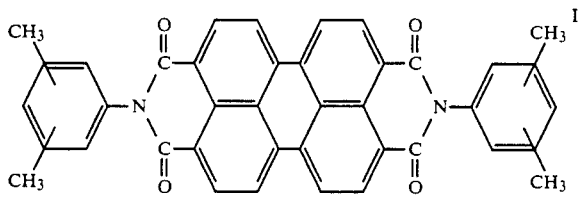

(iii)

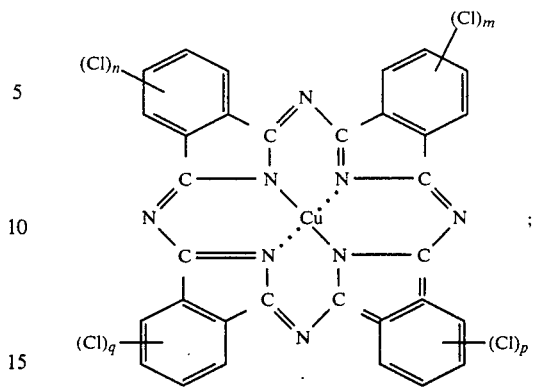

wherein: m, n, p, and q are each either 0 or an integer from 1 to about 4; or,
(iv) mixtures thereof; and,
(b) melt processing said synthetic polymer and said fire retardant material of step (a) into said one or more fibers; and
(c) coating said one or more fibers of step (b) with a polyelectrolytic complex comprising a quaternized coconut oil fatty acid amine and polyethylene or polypropylene having an anionic functional group.

15. The method recited in claim 14 wherein the sum of m, n, and q is either 0 or an integer of 1, 15, or 16.

16. The method recited in claim 15 wherein said carbon black pigment is a furnace type and has a particle size in the range of from about 10 to about 100 nanometers.

17. The method recited in claim 16 wherein said one or more fibers have a critical radiant of at least 0.45 watts/cm$^2$.

18. The method recited in claim 17 wherein flame retardant material is present in said synthetic polymer in an amount in the range of from about 1.0 to 3.0 weight percent based on the weight of said polymer.

19. A fire retardant yarn comprising the fibers prepared in accordance with claim 17.

20. A carpet having a pile comprising the fibers prepared in accordance with claim 17.

* * * * *